United States Patent [19]

Shannon, Jr.

[11] 4,215,248
[45] Jul. 29, 1980

[54] TELEPHONE INTERCOM CIRCUIT

[75] Inventor: Larry S. Shannon, Jr., Corinth, Miss.

[73] Assignee: International Telephone and Telegraph Corporation, New York, N.Y.

[21] Appl. No.: 946,030

[22] Filed: Sep. 26, 1978

[51] Int. Cl.² .................................................. H04M 9/06
[52] U.S. Cl. .................................. 179/99 A; 179/18 AD
[58] Field of Search .................. 179/99, 18 AD, 1 H, 179/37, 38, 39, 40

[56] References Cited
U.S. PATENT DOCUMENTS

| | | | |
|---|---|---|---|
| 3,342,944 | 9/1967 | Barbato et al. | 179/37 |
| 3,786,194 | 1/1974 | Pinede et al. | 179/18 AD |
| 4,105,876 | 8/1978 | Farrell et al. | 179/18 AD |
| 4,109,113 | 8/1978 | Allison, Jr. et al. | 179/99 |
| 4,135,063 | 1/1979 | Bosen | 179/99 |
| 4,136,263 | 1/1979 | Williams | 179/18 AD |

Primary Examiner—Gerald Brigance
Attorney, Agent, or Firm—James B. Raden; Marvin M. Chaban

[57] ABSTRACT

A multi-link intercom with a sequencing logic circuit for controlling a solid state switching matrix to connect station through an available link. Control information from the stations is decoded and stored in a register under sequence control for completion of a connection from a calling station to a called available station over an idle link.

5 Claims, 8 Drawing Figures

STATION CIRCUIT

FIG. 4 REGISTER

FIG. 5 SWITCHING CIRCUIT (MATRIX)

TO 140 a,b,c,d
(FIG. 5)

(CONTROLLER)

TELEPHONE INTERCOM CIRCUIT

BACKGROUND OF THE INVENTION

Intercommunication circuits are, of course, well-known as used primarily with key telephone systems. For example, U.S. Pat. No. 2,883,457 issued Apr. 21, 1959 to Carter et al shows a selective intercommunication system between a maximum of 36 stations with up to two links available. A more recent system is shown by U.S. Pat. No. 3,786,194 to E. Pinede et al issued Jan. 15, 1974. This latter patent discloses a system with a maximum of 36 stations and four possible links. The apparatus and functioning of a link and the switching arrangement were included as novel features of that system.

Conventionally, an intercom circuit responds to depression of an intercom key at one station to allot an available link to handle an intercom call originating at that station. The circuit evaluates dialled digits to switch a path to a called station represented by the dialled digits. A busy test is applied to the called station and the station is rung when found to idle. Response by the called station places the call under the supervision of the link.

SUMMARY OF THE INVENTION

The present invention is directed to an intercom circuit using a sequential controller for operating the circuit. The circuit uses a switching matrix with latches at the respective crosspoints and independent system memory for providing matrix status indications. The controller sequences one call from its initiation through the switch-through phase and ring. Thereafter, the controller is available for additional calls, the link supervising the existing call with both stations being marked as busy for all further calls until released.

Within the system shown, the stations are scanned periodically for a condition in which a station is off-hook and is not connected to a link. When an off-hook station is found awaiting connection, an all-links busy check is made and a register is connected to that station to receive dialled digits.

It is therefore an object of the invention to provide an improved multiple link telephone intercom system.

It is a further object of the invention to provide a multi-link intercom in which each intercom call once initiated is processed by a sequence controller to a call-completed state before other calls are handled.

It is still further object of the invention to provide an improved telephone intercom circuit using digital technology to control a plurality of analog switch paths.

DETAILED DESCRIPTION OF THE DRAWINGS

Figure 1:
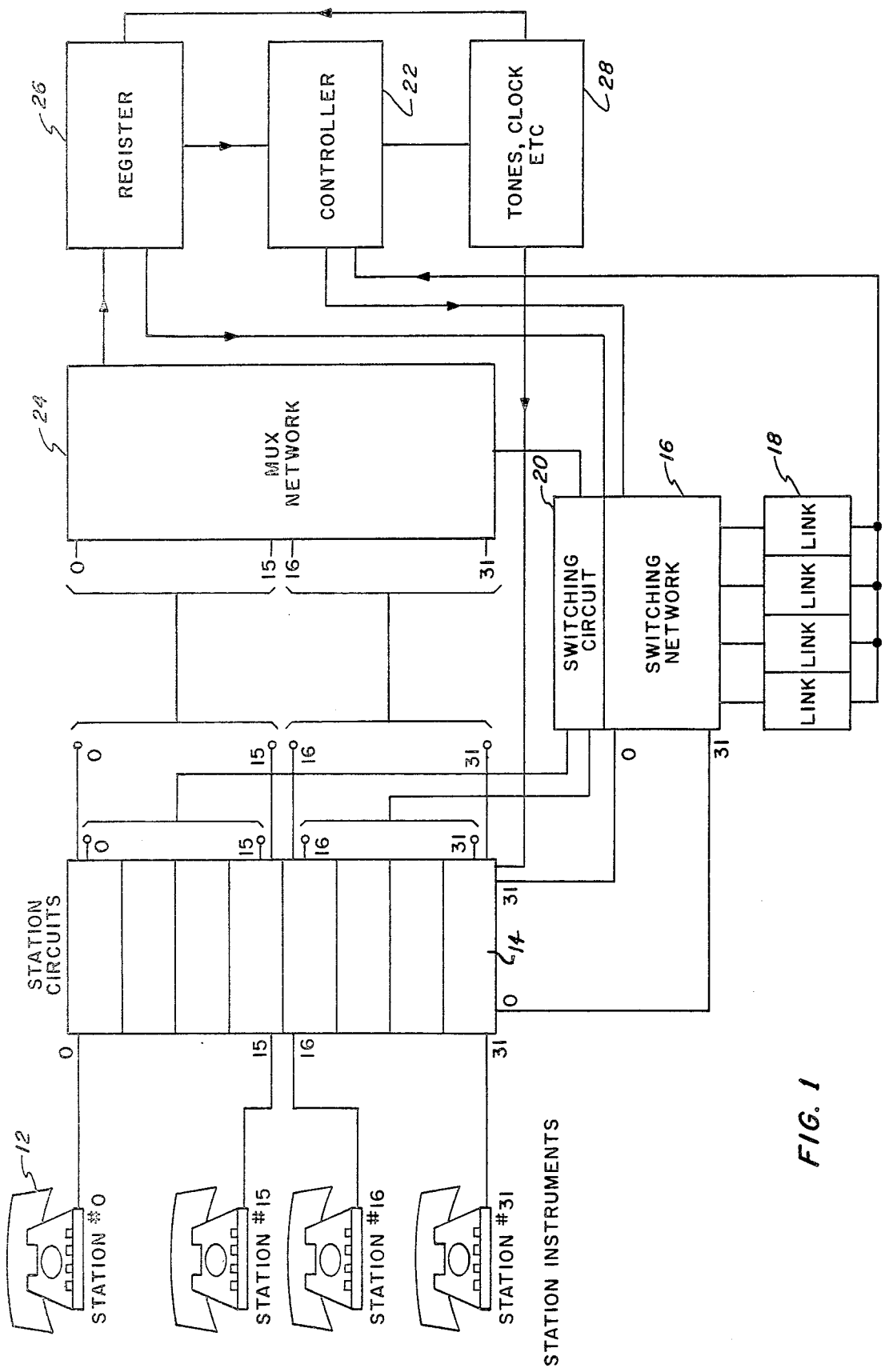
FIG. 1 is a block diagram of a system using my invention.

In the block diagram of FIG. 1, I show an embodiment of my system for handling intercom calls for up to 32 stations, a number of such stations 12 shown with conventional telephone instrument with rotary dial and multiple line keys.

Figure 2:
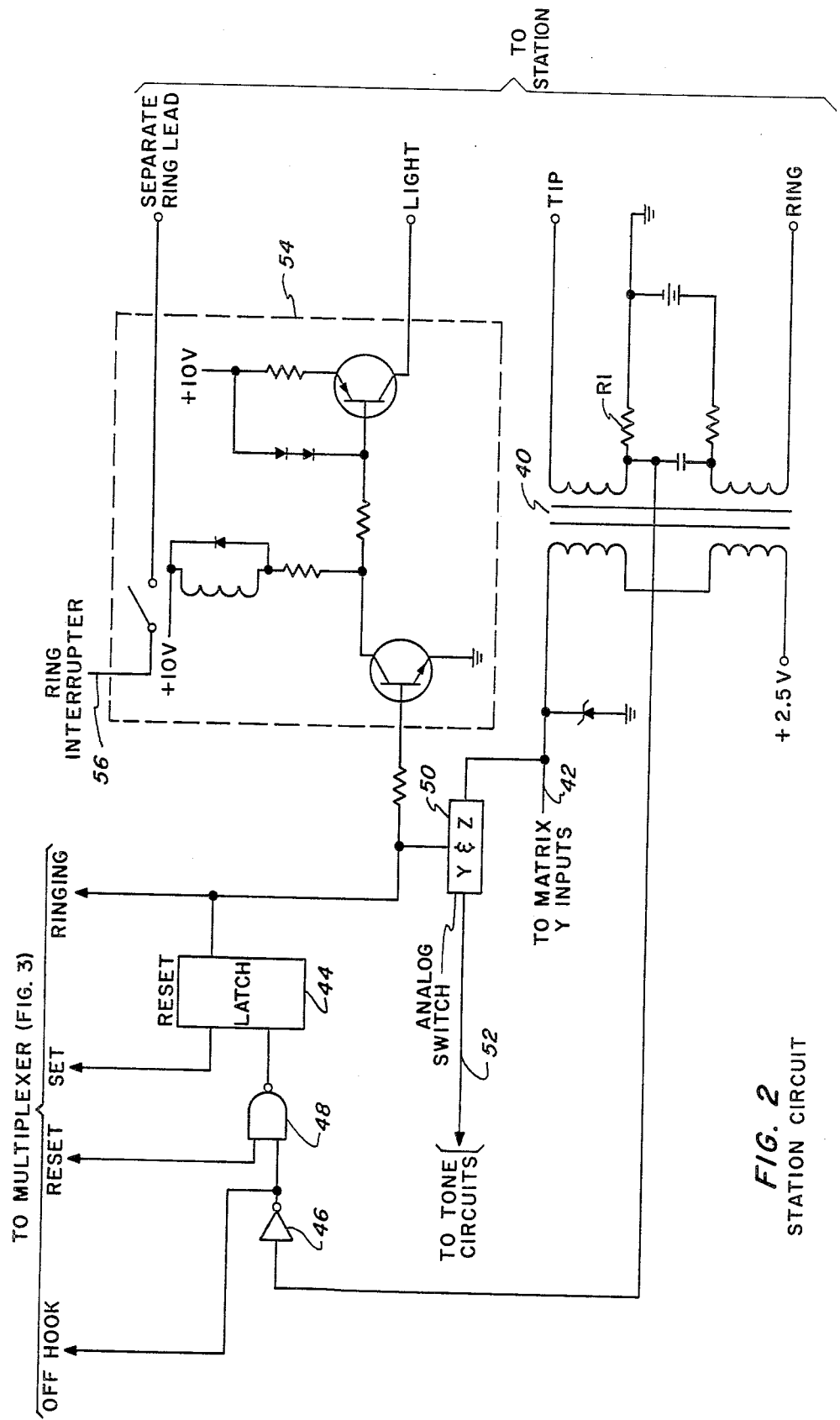
FIG. 2 is a schematic circuit diagram of a typical station circuit of FIG. 1.

Each station accesses the system through its individual station circuit 14. Each station circuit, the details of which are shown in FIG. 2, has little internal logic. The station circuit provides battery feed for the station, and other circuits for interfacing between the system and the station to forward signal indications bidirectionally.

The station circuits provide one multiple of a switching network 16, one module of the network being shown is connected to links 18, four links being available.

The switching network 16 is made up of a number of matrices, each matrix of which may be comprised of any of a number of integrated circuit devices. For example, each 4×4 matrix may be configured with an alignment of 4×4 crosspoint switches such as RCA CD 22100, eight such crosspoint switches may be used for the full 32×4 network. The device set forth as an example is described as a CMOS 4×4 crosspoint switch with control memory.

To interface between the station circuits and the switching matrix, a switching circuit 20 is provided. The switching circuit provides RAM and logic for implementing the steps initiated by controller 22 as decoded by multiplexer network 24. In addition, there is a register 26 for decoding and storing the results of two dialled digits and controlling the switching circuit 20 and switching network or matrix 16 accordingly. The register handles one call until the calling station is switched to the called station at which time the register is ready for another call.

The necessary clock signals and tones are generated by the tones and clock circuit 28. The tones and clock circuit may use any conventional circuits for the cited functions to provide interrupted ring, ring back tone, busy tone and any other tones. In addition any suitable clock source for 1 KHZ and such other clock frequencies may be necessary. No detailed showing of these circuits has been used since conventional devices and circuits for providing these tones and clock signals are well-known.

Each station circuit 14 may be of the type shown in FIG. 2. A station circuit transfers information bidirectionally between its station and the leads of multiplexer 24. Between the station circuit and the station instrument are four conductors, the conventional tip and ring speech leads, a lamp lead, this lead being designated in FIG. 2 as the light lead, and a separate ringing lead. The tip and ring leads for speech or analog signals are fed to an audio transformer 40 for unbalanced speech transmission over the lead 42 to a conductor of the suitable multiple of the switching matrix 16. Each station circuit is coupled to a separate one of the station side matrix leads over its respective lead 42.

In the digital portion of the station circuit, a set-reset latch 44 receives input from the station via transformer 40 to provide an off-hook signal through inverter 46 and NAND gate 48. This off-hook indicting signal is also fed from the inverter to the off-hook lead to the multiplexer. The NAND gate has a second input from the reset lead from the multiplexer. Inverter 46 may be a Schmitt trigger inverter used to indicate an off-hook condition to the multiplexer.

Lead 42 is also directed to one input of a quad analog switch 50. The switch 50 serves four stations and one module of a link-station matrix, one switched lead 52 of the analog switch 50 closing a line path to the tone circuits 28 to provide a tone input to the audio transformer 40. Switch 50 also feeds a transistorized switching inverter 54 which operates an output relay to couple a source of interrupted ring voltage (not shown) on lead 56 over the separate ringing lead to the station. The switching inverter circuit also provides a source of 10 volts to the lamp lead to the station in response to closure of the switch 50 for that station.

Figure 3:
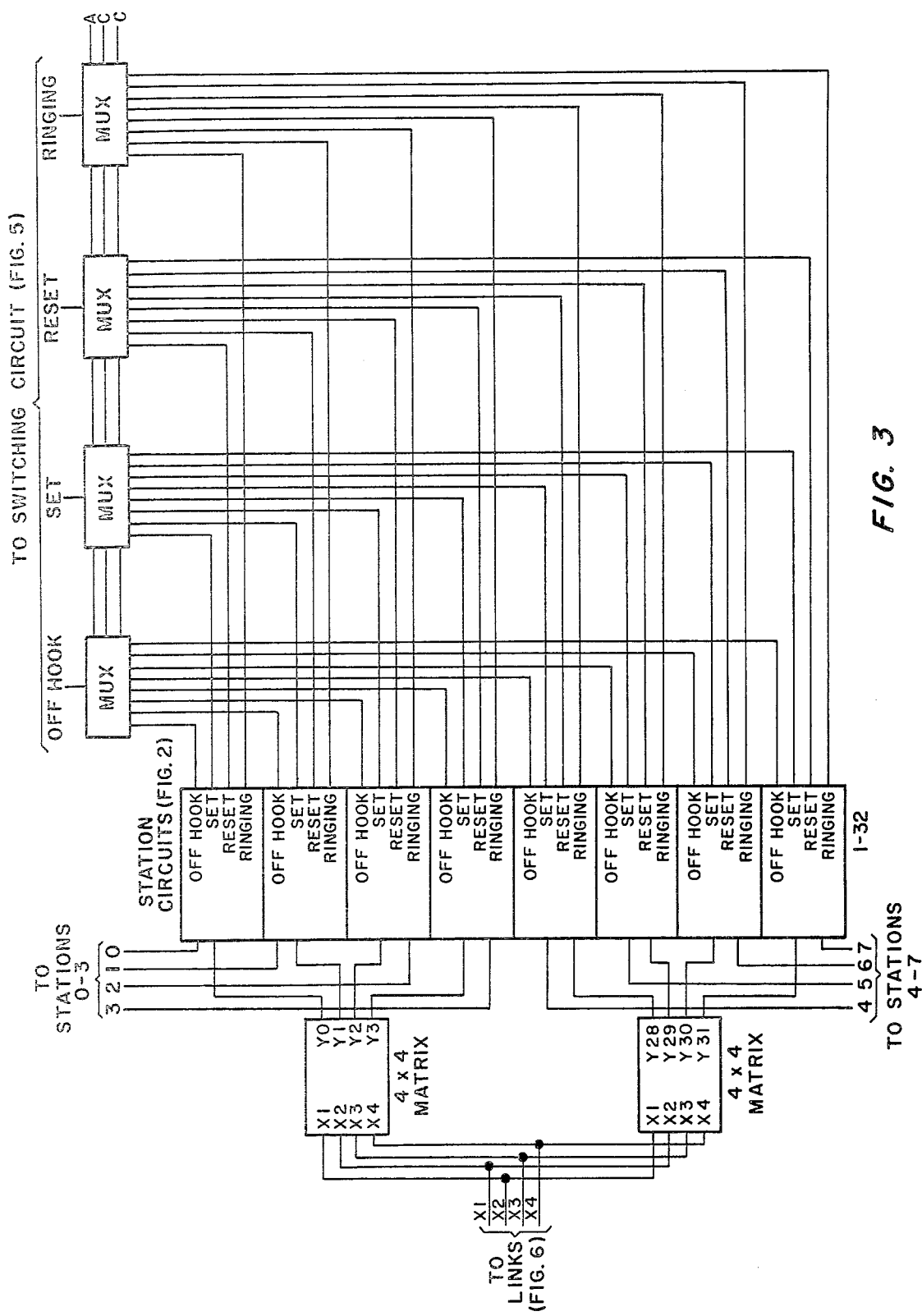
FIG. 3 is a schematic circuit diagram of a portion of the multiplexing network of FIG. 1.

In FIG. 3, I show one half of the multiplexer network, i.e, four multiplex units of the eight needed for the full thirty-two line system. A multiplexer interfaces between the station circuits and the switching circuit of FIG. 5 to set the latches in an addressed station circuit. The individual multiplexers are conventional one to sixteen multiplexer/demultiplexers for operating the switching circuit in response to signals from station circuits, eight such station circuits being shown in FIG. 3.

Figure 6:
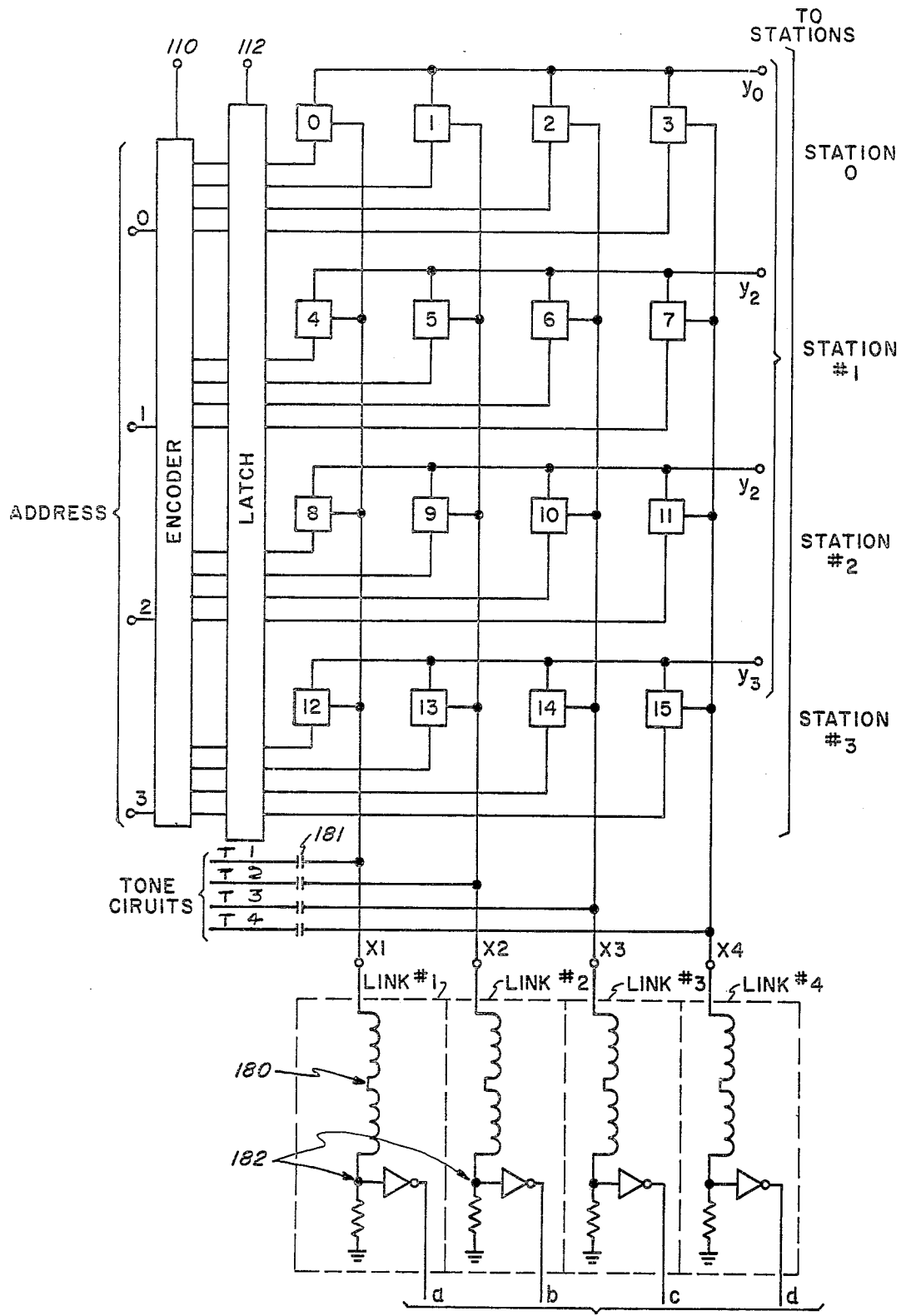
FIG. 6 is a schematic block diagram of one matrix of the switching network of FIG. 1.

Also shown in FIG. 3 are boxes representing two 4×4 switching matrices of the switching network 16 of FIG. 1. For a thirty-two station, four link system, eight matrices would be used. The Y side of the matrices connect to the station circuits with the station circuits being coupled to the stations as shown by conductors 0-7 to station 0-7. The X side of the matrices are connected to the links. A more detailed showing of the switching matrix network is shown by FIG. 6.

Figure 4:
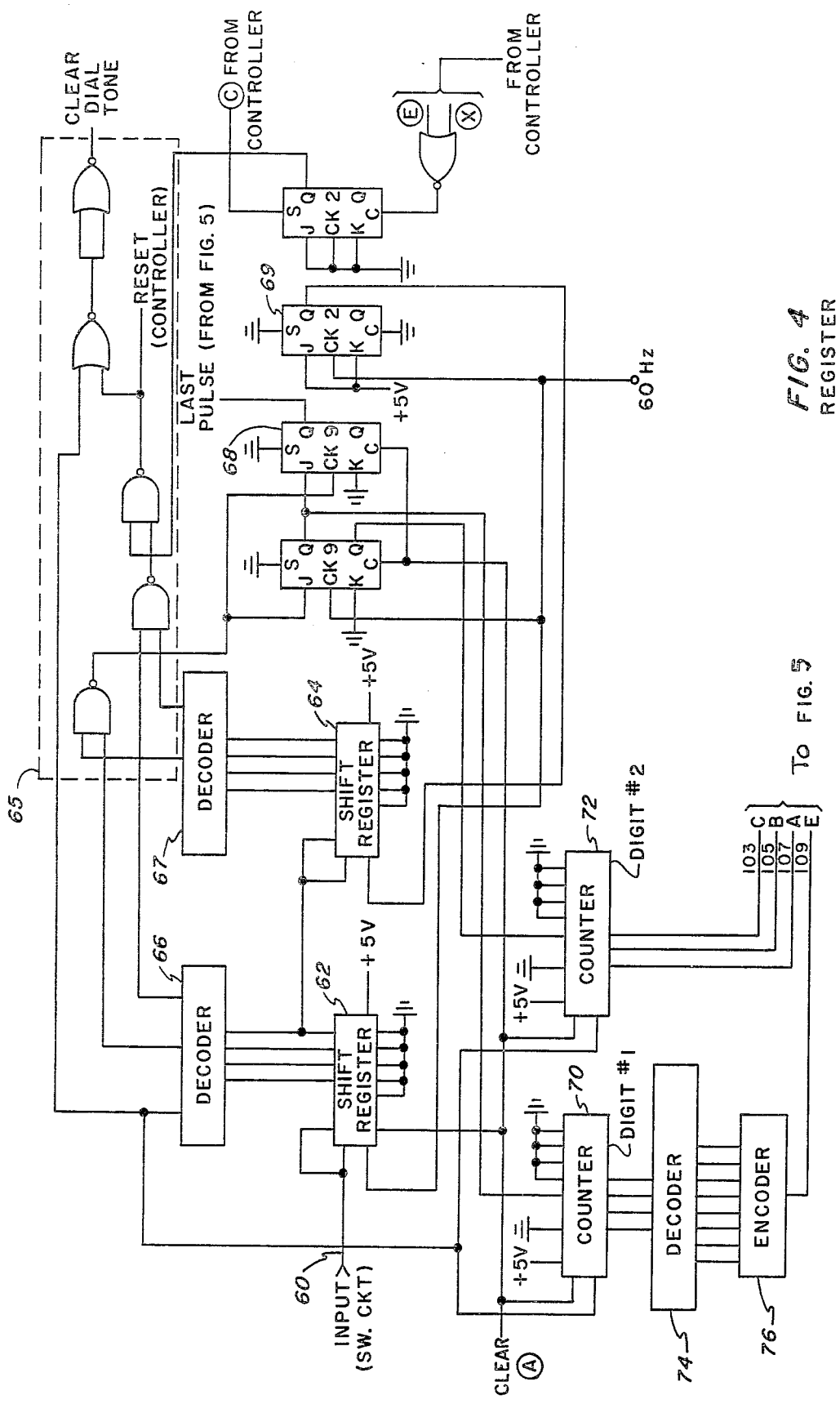
FIG. 4 is a schematic circuit diagram of register of FIG. 1.

In FIG. 4, I show a register for decoding and storing a two-digit dial pulse address. The circuit of FIG. 4 receives its dial pulse input on lead 60 through the switching circuit 20 as will be explained. Pulses received on lead 60 are fed to two serially disposed four-bit shift registers 62 and 64, each register having its own decoder 66 and 67 respectively. The decoders acting through a gating network 65 to a two-bit counter formed by flip-flops 68 and 69 to count the digits received by the register.

The two shift registers are clocked at different rates, i.e., 60 HZ and 30 HZ respectively. The input dial pulses are converted to a series of ones and zeroes at the respective register outputs. The decoders decode the outputs and signal the end of a single dial pulse, the end of a string of pulses, and an on-hook condition as indicated by a continuous open line loop. An on-hook during dialling triggers a reset on the reset lead through the gating network 65. The gating network also provides signals to the tone source, as will be explained.

The indication of a single pulse is used to clock the digit #1 counter 70 which stores the succession of signals representing the first digit. The digit #2 counter 72 in a like manner stores the signals representing the second digit. The outputs of the counters 70 and 72 are in binary coded decimal digit form and must be converted to binary form, the latter action occurring in decoder stage 74 and encoding stage 76 for use in controlling the switching circuit 20 over leads 103, 105, 107 and 109 directed to the switching circuit of FIG. 5.

Figure 5:
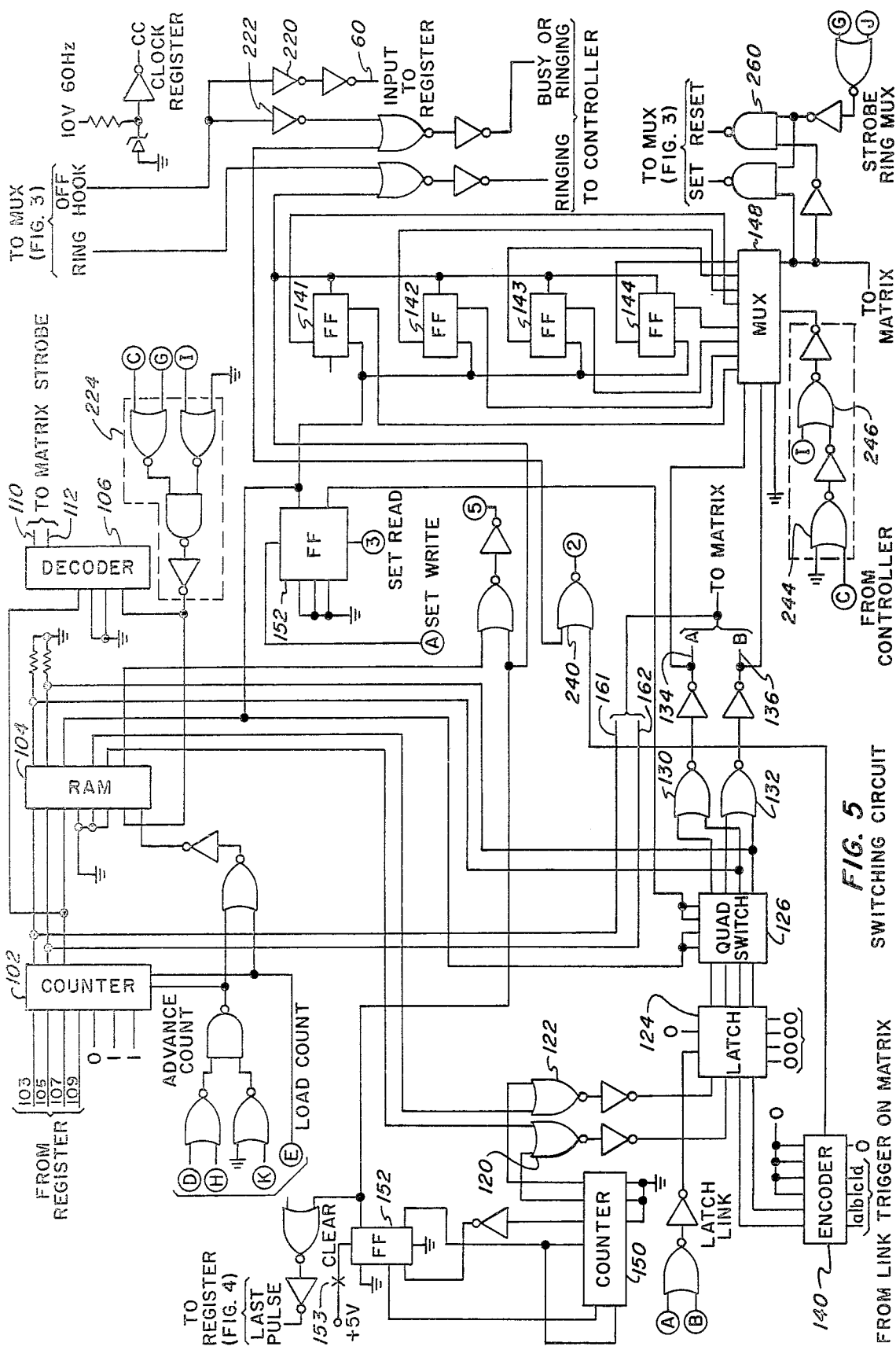
FIG. 5 is a schematic circuit diagram of the switching circuit of FIG. 1.

In FIG. 5, I show the switching control circuit 20 which includes logic and memory for controlling the switching network. In FIG. 5, input leads denoted with an encircled letter indicate inputs from the controller of FIG. 7.

The switching control circuit receives digit signals in binary form from the register and loads those signals into counter 102 which addresses the 4×32 random access memory 104 on command from the system controller. The memory stores the address and status information in a three-bit code for each station of the system. Data from the counter is fed into a BCD to decimal decoder 106 to control strobing of the matrix network over leads 110 and 112. The strobing and storage of data is under the control of signals from the system controller as will be described.

Data from the RAM 104 also is transmitted over leads to OR gates 120 and 122 to set address input latch 124. The latch acts to set a matrix address through the outputs of quad switch 126. The output of switch 126 is connected to NOR gates 130 and 132 to the switching network leads 134 and 136. Latch 124 receives further input from input priority encoder 140, the encoder 140 having conductors to the links as will be explained. Encoder 140 receives link input availability data and encodes them as a link address. Latch 124 is a quad device to latch the link addresses received from the encoder and from the memory.

For sequence control, the switching circuit 20 has a set of link flip-flops 141-144 responsive to inputs from a link address MUX-DEMUX 148. The link flip-flops store the link condition to indicate if a link is busy or idle, and whether ringing is being initiated or terminated to the specific link.

The MUX-DEMUX 148 is a dual device to address the link flip-flop corresponding to the link being acted upon. The address fed to the MUX-DEMUX is determined by switch 126.

Additional features are provided in the switching circuit to clear the circuit such as counter 150, a four-bit counter. The 2 least significant bits are used to generate a false matrix address to clear all matrix switches when a system "clear" is initiated by flip-flop 152. This counter also resets the clear flip-flop at the termination of its count.

Flip-flop 152 is used to hold the clear condition until all the memory and the matrix is cleared. This flip-flop is then reset by counter 150. The outputs of flip-flop 152 are also used to hold selected inputs of Controller (22) high, causing the Controller to clear all memory and matrix switches, regardless of the actual conditions. Flip-flop 152 may also be reset by manual operation of a suitable switch 153 which may be provided at the system to provide a manual reset.

For controlling the reading or writing on link flip-flops 141-144, a read-write flip-flop 152 is used. The outputs of this flip-flop are used to control or determine the status of the inputs of the memory, the matrix, and the link flip-flops. The output of this flip-flop is also used to switch the link address from memory or from available link signals.

In FIG. 6, I show a four by four matrix of the switching network and the respective links connected to the X leads of the matrix. As mentioned previously, the switching network for 32 stations is comprised of eight such units with the four links connected in multiple to the X terminals of the matrix and four stations to the respective Y conductors.

Four address inputs are provided, these being connected to the switching circuit leads 134, 136, 161 and 162 (FIG. 5) as addressing the desired station. Leads 134, 136, 161 and 162 are address leads directed to all matrices in the system. For individual matrices, decoder 106 strobes the matrices over leads such as 110 and 112, each such lead directed to a different matrix. Data to the matrices is received from MUX 148 (FIG. 5). The matrix has a strobing input 110 and data input 112, these emanating from outputs of decoder 106 and output of link flip-flip MUX 148 of FIG. 5. These strobe leads enable the 4 to 16 line encoder 170 and latch 172 of the matrix. Each of the sixteen crosspoints of the matrix has its own memory element and latch circuit for holding the crosspoint closed.

In addition, FIG. 6 shows each link circuit (a-d) as having its own transformer 180 and a Schmitt trigger input 182, the trigger outputs being coupled to leads a-d of encoder 140 (FIG. 5) to signal when a link is in use.

Each link conductor X1-X4 (FIG. 6) has a conductor T1-T4 extending to tone circuits (not shown). The conductors T1-T4 each has its own 10 microfarad capacitor 181 in the tone path conductors to provide d.c. isolation.

Figure 7:
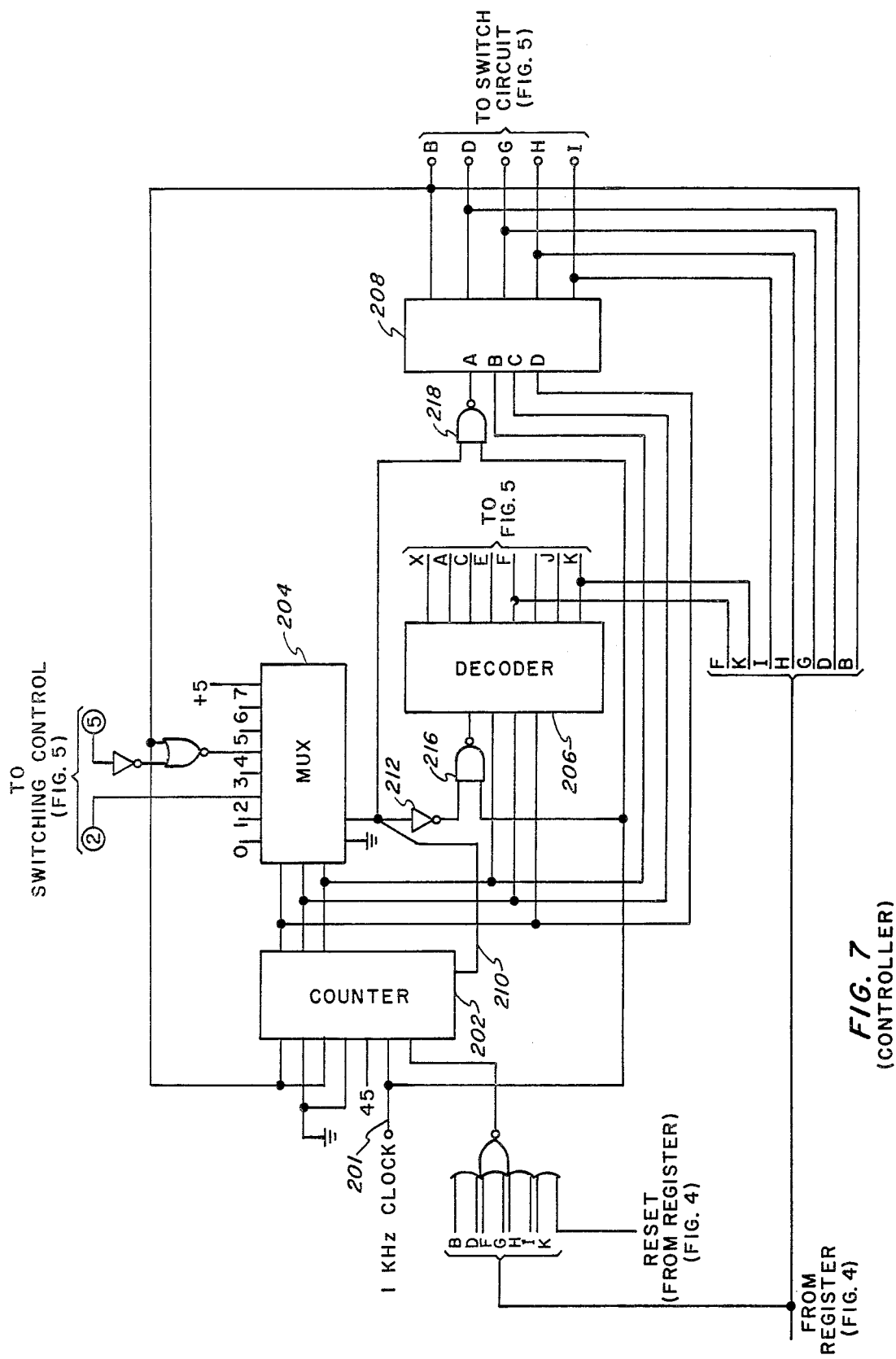
FIG. 7 is a schematic block diagram of the controller of FIG. 1.

The sequence controller 22 shown in detail in FIG. 7 is a simple hard-wired digital logic device for stepping the circuit of FIG. 1 through a sequence. A controller of this type is known and has been called a Generalized Logic State Controller in a paper by C. L. Richards published in Engineering Design News.

The controller shown is driven by a clock input on lead 201 of 1 KHZ. This clock input is fed to a four-bit counter 202 used as the state counter for the controller. The counter feeds an eight to one line multiplexer 204 used as the traffic control selector. A pair of three to eight line decoders 206 and 208 are used as the transfer function generator. The output of the multiplexer 204 on lead 210 provides the enabling clock input of the state counter 202. The multiplexer output on lead 210 is inverted by inverter 212 to provide the most significant bit input for the decoders 206 and 208 through respective NAND gates 216 and 218, the second input to the NAND gates coming from the 1 KHZ clock input 201. Inverters 220 and 222 (FIG. 5) are positioned in the off-signal gating circuit from the multiplexer network 24 to the register over lead 60 and to the controller.

The controller 22 starts in one of several states investigates the condition of an input at that state to generate an output while stepping to a new state based on an observed condition of the one state. The observed conditions represent conditions of a station being serviced. These conditions, such as off-hook, dialling, ringing or connected to a link, are transmitted to the switching circuit as observation inputs to the controller. The controller acts on these observed conditions within its sequence to generate outputs to the switching circuit for implementation of functions such as connection to or release from a link, supplying tones such as ringing or ring back, as necessary.

Inputs and outputs from the controller of FIG. 7 to the switching circuit of FIG. 5 are marked on FIG. 5 by a reference letter or number encircled. These letters represent the output occurring at steps in the flow chart of FIG. 8, the rectangular activity boxes in FIG. 8 denoted by a corresponding letter (A-K). Each branch step in FIG. 8 is denoted by a number (1-7).

Figure 8:
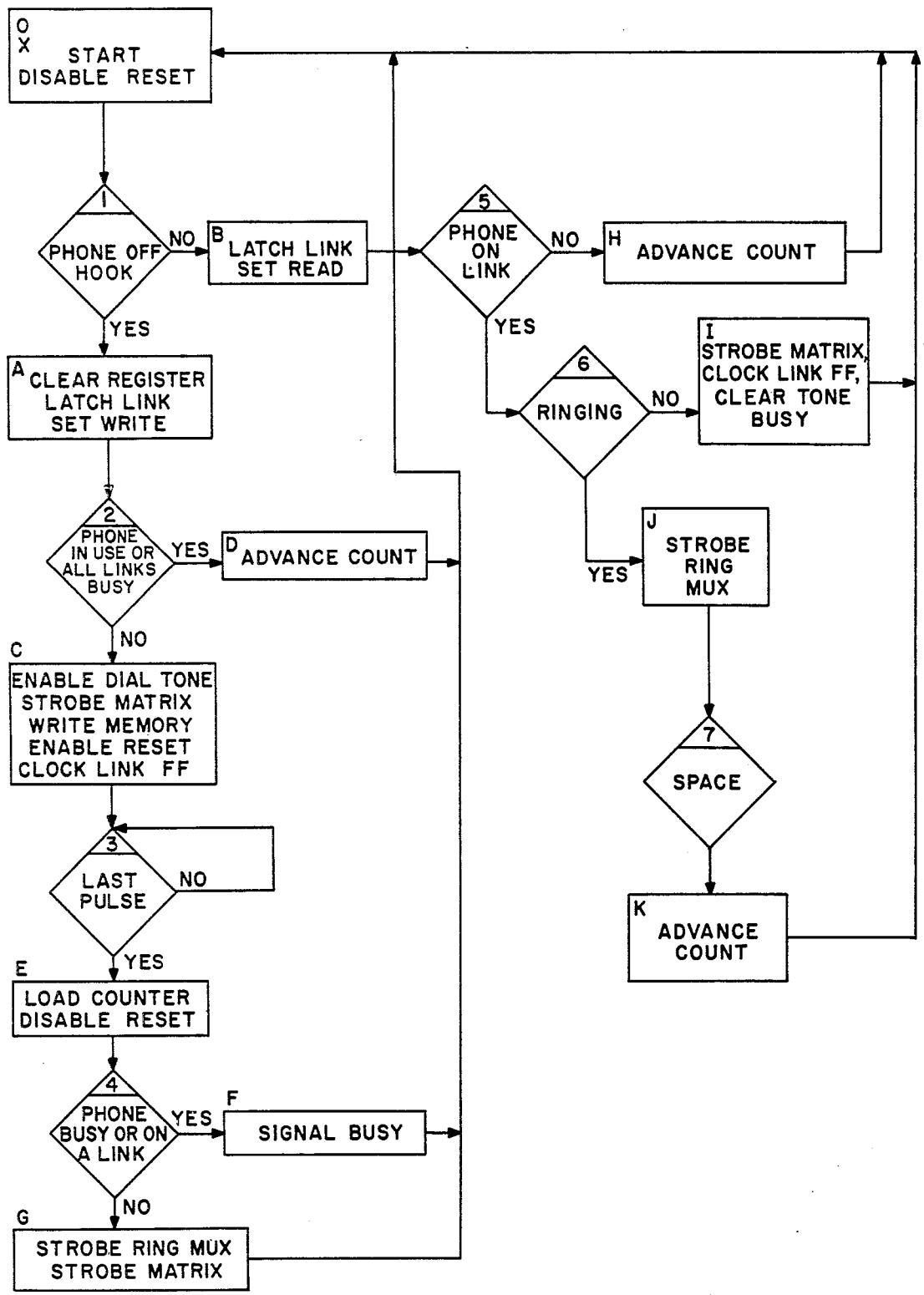
FIG. 8 is a flow chart showing the operation of the controller to process calls through the system of FIG. 1.

Viewing the circuits of FIGS. 2-7 in light of the flow chart of FIG. 8, it should first be noted that the controller operates continuously. Assuming a reset due to any condition, the controller restores and advances its count to address the next station.

Assuming the next station is off-hook (Block 1-FIG. 8), the tip-ring circuit will be closed and current in resistor R1 (FIG. 2) causes an input to inverter 46 to appear high. Input to MUX is then low. At this time, the latch state is not affected. A check is made through the memory of the position in memory allocated to that station to determine whether the station is in service (available for use), and to see whether all links are busy. In the event the station is in service or all links are busy, then the D input to the controller is activated to advance the counter and RAM count to the next station. This sequence may be traced through boxes O-1-B-5-H on FIG. 8. All links being busy provide an indication through encoder 140 (FIG. 5) to NAND gate 240 and the #2 input to the controller.

If, however, the station is in service and a link is available, the sequencer will continue. The steps noted in the block C will occur (1) Enable dial tone to the calling station; (2) Strobe the matrix to access a link for coupling to the station through the crosspoint common to the link and station; (3) Write the change of status in the memory; (4) Enable the reset latch; and (5) Clock the link flip-flop representing the selected link.

Taking these points separately, relative to the specific circuits, dial tone is enabled from the tone circuits to the subscriber station circuit (FIG. 2) over switch 50 which provides a path over lead 52 from the tone circuits. The matrix is strobed from decoder 106 over leads 110 and 112 to latch an idle link for the station being served in response to a signal over the C lead from the controller over gate network 224. The crosspoint in the matrix of FIG. 6 representing the idle link and the station being served is closed to connect the available link for the call.

The C signal also changes the status on the RAM 104 (FIG. 5) to mark the station as being in use.

The C signal to gate network 244 is also fed to multiplexer 148 through gate 246 to the set leads of FF 141-144. With the station off-hook and an idle link being allotted, the latch is pulsed to the set condition. The signal through multiplexer 148 acts to trigger the flip-flop for the available link which had been allotted for the call.

The register of FIG. 3 had been enabled by clearing signal and is available for storage of two digits. On the first pulse of the interrupted dial pulses, the register gates a signal on the clear dial tone lead to the tones circuit. Subsequent pulses are stored and decoded for the called station. As long as two full digits are received, the sequencer continues to maintain the registration operation. When the last pulse is received (box 3 of FIG. 8), followed by an interdigital duration pause, the data from counters 70 and 72 of FIG. 4 representing the two digits are loaded on leads 103, 105, 107 and 109 of the register to counter 102 of the switching circuit for reading the condition of that station on the RAM 104 accordingly and for strobing the matrix on leads 161 and 162 to prepare to connect the called station to the calling station and link. This sequence is represented by box E. The address of the called station from the register is loaded when the load count line (E) is high. The register address then appears at counter outputs A, B, C and is available to address RAM, MUX and Matrix. A path is thereby switched to the calling station over the matrix.

If the called station is found to be busy on the RAM, a signal on lead 5 (FIG. 5) is sent to MUX 204 of the controller (FIG. 7) to cause the sequencer to move into sequence of box F (FIG. 8) to provide a busy signal to the calling station.

If the called station is not busy, the called station must be connected to the link so that the station can be rung. For this purpose, the G sequence of the controller through gates 224 and decoder 106 strobes the matrix, strobes the ring multiplexer through NAND gate 260. If the called station answers, the ringing must be terminated through the functions of box F of FIG. 8 and the sequencer restored to advance the count and process the next off-hook indication.

Once a call is completed, the stations involved in the call appear to be off-hook and on link. The controller follows a 0-1-2-D pattern in the flow chart of FIG. 8 for such a station. Upon termination of a call, a station will appear to be on-hook and on a link. The reset signal will cause the controller to follow a 0-1-5-6-I pattern and the stations involved will be disconnected.

The system as shown provides all the generally-known features of conventional key system intercom units with as many as four links or intercom calls possible for a system with as many as thirty-two lines.

I claim:

1. A solid state intercom circuit for a telephone system in which there are a plurality of stations each of which has selective intercom access to the remaining stations of said system, comprising a sequence controller responsive to sensed conditions at said stations for initiating cycles directed toward completing calls from respective calling stations to called stations over a plurality of intercom links, a solid state switching matrix for interconnecting said calling and called stations over intercom links, a register for storing dialled digits representing a station being called, a system control circuit memory with a location for each station of said system and means for storing in said memory the status of said station and the address of a link associated with such station during an in-use condition of said station, means for scanning stations of said system, said sequence controller responsive to a station being found off-hook by said scanning means for initiating a sequence to examine the memory location associated with said off-hook station to determine its prior status and, in response to a determination that said prior status was idle, for advancing said sequence through a plurality of steps to complete a call initiated by said station.

2. An intercom circuit as claimed in claim 1, in which there is means individual to each link for storing the condition of said link, and further independent means for feeding a condition indication from each link to said memory.

3. An intercom circuit as claimed in claim 2, in which each link has a trigger circuit coupled thereto for providing link data to said feeding means.

4. An intercom circuit as claimed in claim 1, in which said register comprises a stage for each digit to be registered, and in which each stage includes a shift register, decoder, counter and logic therefor.

5. An intercom circuit as claimed in claim 1, in which each said station includes a control circuit associated therewith for sensing the condition of its station, and includes means coupled both to the switching matrix and to said scanning means for providing a ring control signal.

* * * * *